Aug. 26, 1969  P. J. NATHO  3,463,446
LOW STRESS STEM CONNECTION
Filed March 13, 1967  2 Sheets-Sheet 1
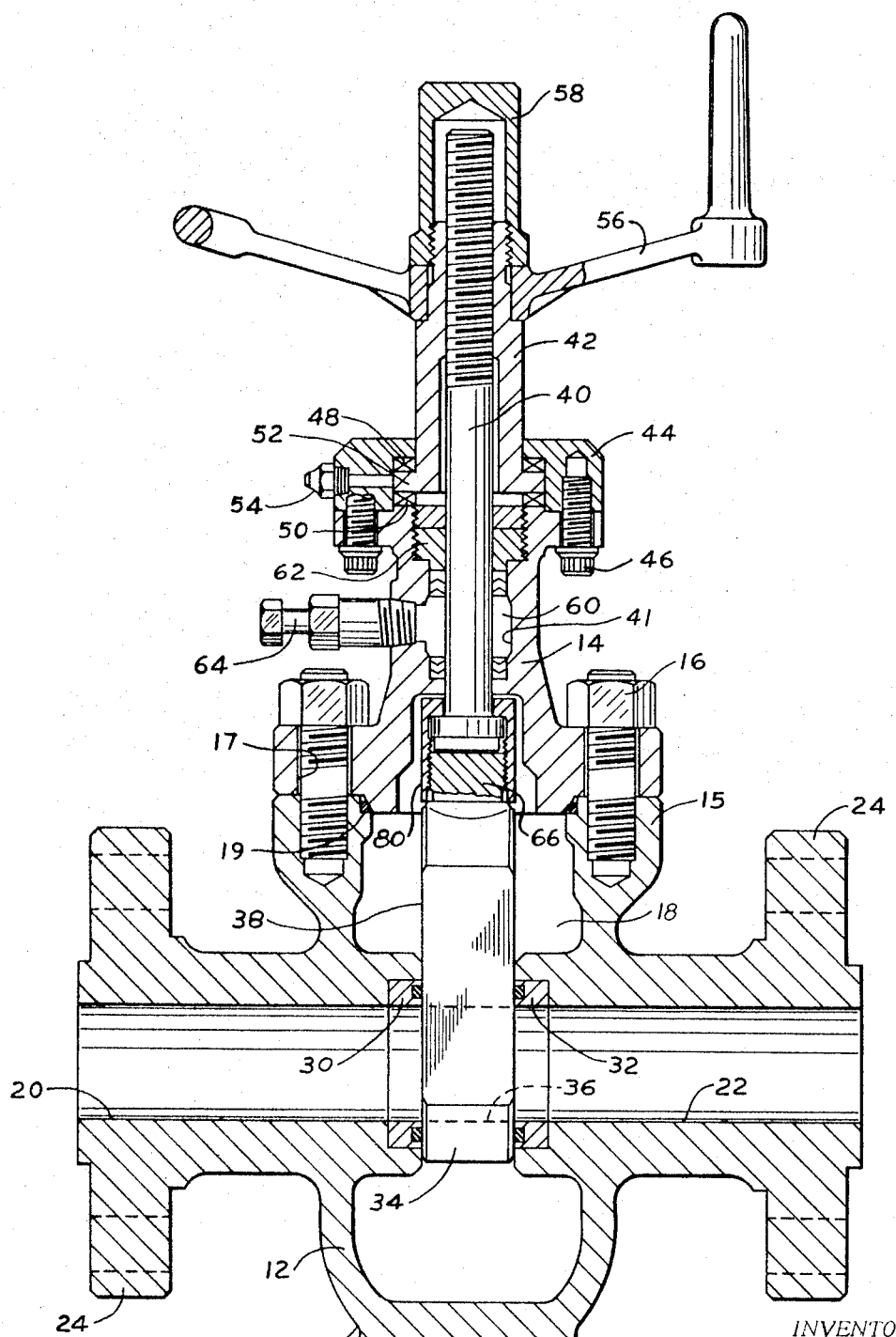
FIG. I
INVENTOR.
PAUL J. NATHO
BY
*James L. Jackson*
AGENT

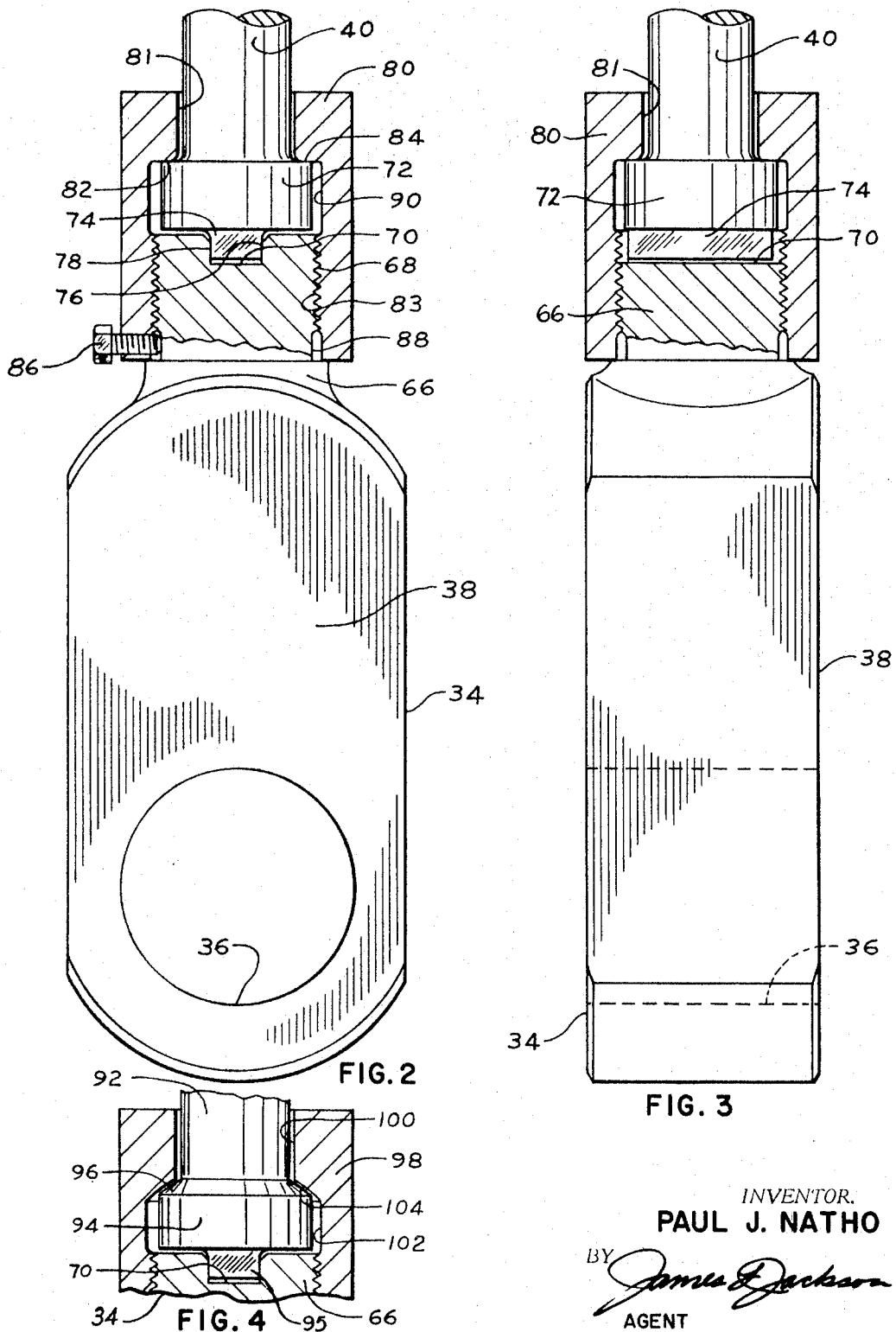

United States Patent Office 3,463,446
Patented Aug. 26, 1969

3,463,446
LOW STRESS STEM CONNECTION
Paul J. Natho, Houston, Tex., assignor to ACF Industries, Incorporated, New York, N.Y., a corporation of New Jersey
Filed Mar. 13, 1967, Ser. No. 622,579
Int. Cl. F16k 25/00, 31/44, 31/00
U.S. Cl. 251—84                           6 Claims

ABSTRACT OF THE DISCLOSURE

A stem connection structure for connecting the operating stem of a mechanical device to the movable element of the mechanical device. The connection structure includes interfitting structural elements which cooperate to allow lateral movement of the movable element relative to the stem and is provided with a collar for retaining the stem and movable element in assembly. The interfitting stem and movable element parts and the collar are so related as to maintain the stress levels within the parts of the connection at a minimum to prevent stress corrosion of the parts. The connection structure is also designed to provide an exceptionally high strength connection with minimum space requirements.

BAKGROUND OF THE INVENTION

While it will become obvious from the description of my invention that the connection structure may be utilized in any of a number of different applications, the invention, to facilitate understanding thereof, will be illustrated and described as it applies to valves. Description and explanation of my invention in cooperation with valve structure is not intended to limit the spirit and scope of the invention in any manner whatever.

Due to the recent trend in the pipeline industry and the petroleum production industry toward the construction of pipelines and other fluid flow handling structures having extremely high operating pressures and extremely high velocities of fluid flow and especially due to technological advances in the exploration for petroleum products, the need has arisen for larger and more efficient valves to safely control these high pressures and high fluid flows. Technological advances in the valve industry brought about by better structural materials and construction procedures, have resulted in valves which are well suited to the needs of these industries.

One of the problems, which has arisen due to the development of valves operating at high fluid pressures, has been the increased thrust and torque requirements frequently encountered when the valve element of the valve is moved between its open and closed positions. Increased operating torques and excessive thrust loads encountered necessitated the development of greater strength valve stem-valve element connection structure. Simple structural size increases in the stem connection will not solve this problem since the design of the connection is frequently complicated by limitations in the amount of available operating space for such connection structure. It is a primary object of the invention, therefore, to provide a novel valve stem-valve element construction which because of its novel design inherently provides superior torques and thrust loads expected and yet which utilizes no more operating space than is required by present connection structures of this nature.

An important aspect concerning the use of valves for petroleum service is a phenomenon referred to as "stress corrosion," which causes a breakdown of the metal structure of valve parts when the valve is subjected to various service conditions. Although stress corrosion has been in existence from the beginning, some of the causes thereof have been recently discovered and research is being conducted to determine how to eliminate stress corrosion or to at least reduce it to an ineffective level. It has been found in such services as hydrogen sulfide, which in the valve industry is considered a sour service, that when the parts of a valve are maintained under a stress condition of at least a certain magnitude, the hydrogen sulfide reacts with the metal from which the valve parts are composed, and this reaction causes the parts to fracture and fail. A number of varying chemical theories have been published concerning possible causes of stress corrosion, but the important mechanical aspect of stress corrosion is the fact that accelerated chemical reaction with the metal parts does not take place until the valve parts are placed under a predetermined stress. If valve parts are allowed to remain under stressed condition for extended periods in the presence of hydrogen sulfide, it is probable that signs of stress corrosion will appear. The stressed metal in time will come apart as if it were faulty. The valve stem-valve element connection structure of valves is a frequent area for the development of stress corrosion because of the stresses generally found in these parts during operating conditions of the valve. For example, in a gate valve, stress in the valve stem-gate connection parts frequently occurs due to slight misalignment of the parts resulting from the stackup of manufacturing tolerances. It has been found that small misalignment of valve parts can result in the development of metal stress of a considerable magnitude in the valve parts. Also, the force of the pressurized fluid controlled by the valve acting on the gate member, especially in the closed position thereof, frequently causes binding or stressing between the gate and stem at the connection therebetween. This stress at times is sufficient to cause accelerated stress corrosion if the valve is subjected to sour service such as hydrogen sulfide. It is, therefore, an important object of the present invention to provide a novel low stress connection structure which is effective at all valve operating conditions to prevent the development of excessively stressed conditions between the stem and valve element connection parts and thereby to eliminate or reduce the possibility of stress corrosion of such parts.

SUMMARY OF THE INVENTION

The invention is directed to an interengaging slot-key relationship between the valve stem and valve element of the valve which will allow shifting of the valve element relative to the stem to eliminate stresses which would otherwise be developed by slight misalignment of the valve parts which might result from the stackup of tolerances during the manufacturing process. The slot-key engagement is also operative to prevent rotation of the valve stem within the bonnet of the valve. A generally cylindrical collar member surrounds the valve stem and is retained on the valve stem by an enlarged head formed integrally with the valve stem. The collar member is connected to an extension of the valve element, such as by threaded engagement or the like, and is effective to positively retain the key and slot engagement structures in interengaging relationship.

A preferred embodiment of the invention has been chosen for the purpose of illustration and description and is shown in the accompanying drawings forming a part of the specification wherein;

FIGURE 1 is a sectional view of a gate valve constructed in accordance with the present invention;

FIGURE 2 and FIGURE 3 are fragementary sectional views which illustrate the gate and stem connection structure of the invention of FIGURE 1 in side and front elevations respectively and which illustrate the gate-stem connection structure in partial section;

FIGURE 4 is a fragmentary sectional view illustrating a modified embodiment of my invention.

Referring now to the drawings for a better understanding of this invention, a through-conduit gate valve 10 is illustrated in FIGURE 1, which comprises a valve body assembly 12 and a bonnet assembly 14. While a through-conduit type gate valve is illustrated for purposes of explanation, it is not intended that the invention be limited thereto. As will become obvious from the detailed description of the invention set forth hereinbelow, the invention is readily applicable to other types of valves and other mechanical devices. The bonnet assembly is fixed to an upper flanged portion 15 of the valve body 12 by a series of bolts 16, which are threaded into the body and which extend through openings 17 in the bonnet 14. The bonnet 14 forms a closure for the opening defined by the annular flanged portion 15 of the valve body and cooperates with the valve body to define an enclosed valve chamber 18. A dynamic sealing member 19 is interposed in an annular groove defined between the bonnet and valve body and effectively develops a pressure responsive seal between the valve body and bonnet. The annular sealing member 19 may be composed of an elastomeric material or a soft malleable metallic material depending upon the nature of service and the operating pressure ranges for which the valve is designed. The valve body 12 is provided with inlet and outlet passageways 20 and 22, respectively, which are disposed in fluid communication with the valve chamber 18. The valve body 12 is provided with connection structures such as the flanged structure shown at 24 for bolted connection of the valve 10 into a fluid carrying pipeline. The valve body 12 obviously may be provided with other commercially available connection structure, such as weld end structure or clamped structure for conventional connection of the valve 10 into a pipeline system without departing from the spirit or scope of this invention.

A pair of annular seat members 30 and 32 are retained within seat recesses disposed about the flow passages 20 and 22, and are disposed in generally parallel relationship. A gate member 34 is disposed between the seat members 30 and 32 for reciprocation within the valve chamber 18 and includes a port 36 for alignment with the flow passages 20 and 22 in the open position of the valve. The gate member 34 includes a solid portion 38 which blocks the flow of fluid through the inlet and outlet passages 20 and 22 in the closed position of the valve to prevent the flow of fluid therethrough.

A valve stem member 40 extends through a stem passage 41 formed in the bonnet member 14 and is connected at its upper extremity to valve stem drive structure as illustrated in FIGURE 1. Valves or mechanical devices in accordance with the spirit and scope of this invention may be of the manual type as illustrated in FIGURE 1, but it is deemed obvious that any one of a number of commercially available power operator mechanisms may be provided for controlling movement of the valve stem.

For purposes of explanation, the valve stem drive mechanism includes an internally threaded drive sleeve 42, which threadedly receives the upper extremity of the valve stem 40. A bearing housing 44 is connected to the upper extremity of the bonnet 14 by a series of cap screws 46. The stem drive sleeve 42 is supported for rotary movement relative to the bonnet 14 by upper and lower thrust bearings 48 and 50, which are disposed one on each side of an annular flange 52, defined on the lower portion of the drive sleeve 42. The bearing housing 44 retains the bearings 48 and 50 and the drive sleeve 42 in assembly. Lubrication of the bearings 48 and 50 may be of a permanent or sealed type or lubrication may be effected by introducing lubricant through an external lubricant fitting, such as that illustrated at 54 in FIGURE 1. A handwheel 56 is disposed at the upper extremity of the drive sleeve 42 and is retained thereon by a combination retainer nut and stem cover 58. Obviously any suitable handwheel construction may be employed in lieu of the specific structure illustrated in FIGURE 1.

The stem passage 41 through the bonnet 14 defines an annular packing chamber in which is disposed a packing assembly 60 to form a fluid tight seal between the valve stem member 40 and the bonnet structure 14. The packing assembly 60 may include any of a number of commercially available packing materials such as plastic packing or packing material produced from petroleum products, for example. A packing retainer 62, which is threaded into the bonnet passage, retains the packing assembly 60 in proper position. A packing fitting 64 is threadedly received into the bonnet structure 14 and is disposed in fluid communication with the packing chamber. Through manual manipulation of the packing adapter, the packing gland may be replenished with packing material in the event packing leakage develops due to wear of the packing assembly.

With reference now to FIGURES 2 and 3, which illustrate in detail an important aspect of the instant invention, the valve element or gate 34 includes an integral extension 66 having external threads 68 formed thereon. The extension 66 is provided with an elongated slot 70, which is disposed in generally parallel relationship with the axis of the port 36. The valve stem 40 is provided with a generally cylindrical enlargement 72 at the lower extremity thereof which may be integral with the stem or affixed thereto in any desirable manner. An elongated key 74 is formed on the lowermost portion of the enlargement or enlarged head 72 and is disposed within the elongated slot 70. The slot 70 is provided with generally parallel side surfaces 76 which are positioned in close relationship with generally planar parallel side surfaces 78 formed on the key structure 74 of the stem 40. The side surfaces 76 of the slot and 78 of the key respectively eliminate lateral shifting of the gate member 34 in a direction generally normal to the axis of the port 36. Due to the interfitting relationship between the slot and key structures of the stem and valve extension 66, the gate member 34 is allowed to shift in a direction generally parallel with the axis of the port 36 in response to any condition producing a force or stress in a direction generally axially of the port. The key and slot structures also effectively cooperate to prevent rotation of the stem member 40 relative to the valve element 34. As was discussed hereinabove, the gate member 34 may be forced downstream, especially in the closed position thereof, by the pressurized fluid within the valve.

A generally cylindrical collar 80 is provided for connection of the stem 40 to the extension 66 of the valve element 34. The collar 80 is provided with an aperture 81 which defines an annular internal shoulder 82 which is disposed for engagement with an annular external shoulder 84 formed on the valve stem 40 by the enlarged head portion 72. The collar 80 is provided with internal threads 68 formed on the extension 66. A lock bolt 86 is carried at the lowermost extremity of the collar 80 and is received within an annular reduced diameter groove 88 formed in the valve element extension 66. After the collar member 80 has been threaded onto the extension 66 to bring the key and key slot structures 74 and 70 into proper interfitting position, the lock bolt 86 is manipulated to positively lock the collar 80 against relative rotation with respect to the extension 66.

The aperture 81 through which the valve stem 40 extends is substantially larger in diameter than the diameter of the stem member 40, thereby allowing the collar 80 to move laterally in any direction relative to the stem. This allows the stem to achieve proper alignment with the valve element 34 without causing the development of shear stresses in any of the parts which might otherwise be developed due to minute inaccuracies in machining or due to any adverse effects of tolerances.

The internal threads of 83 of the collar 80 are slightly larger than the enlarged head 72 of the valve stem providing sufficient clearance to allow the enlarged head to pass through the threaded portion of the collar upon assembly of the collar to the valve stem. The collar 80 is provided with an enlarged internal diameter area 90 which is substantially larger than the diameter of the enlarged head 72 of the valve stem 40. As the collar 80 is threaded onto the extension 66 of the valve member 34, the enlarged diameter portion of the collar 80 effectively allows transverse shifting of the collar 80 relative to the valve stem 40 to achieve alignment between the collar and the valve element 34, and to provide a connection between the stem and collar which is virtually free of lateral stresses. Also the threaded connection between the collar and the extension 66 will be virtually free of lateral stresses since the collar is allowed to seek its optimum position relative to the stem 40.

The annular shoulder 82 within the collar 80 defines sufficient surface area of engagement with the annular shoulder 84 defined by the enlarged head 72 on the stem 40 so that stress distribution in tension between the collar 80 and the stem 40 will remain substantially below the stress level at which stress corrosion is likely to occur. Also the threaded connection between the collar 80 and the extension 66 of the valve element 34 is designed to provide sufficient surface area contact between the collar and valve element to maintain the tension and compression stresses in the material from which the parts are made at a value below the stress corrosion level of these materials. This threaded connection is also designed to provide exceptional strength in relation to the limited size of the structural components forming the connection structure.

An important aspect of the structural connection which enhances the strength thereof is the provision of stem connection structure allowing the stem member 40 to be maintained at a uniform dimension throughout its length except for the integral lowermost portion thereof forming the enlarged head 72. This stem design allows maximum tensile strength of the valve stem and causes stress forces to be transmitted uniformly throughout the stem structure. This construction allows the stress per unit level of the stem to be maintained at a low level. The annular shoulders 82 and 84 of the collar and the enlarged head are generally disposed in normal relation with respect to the axis of the stem and collar, thereby providing for easy machinability thereof. The annular surfaces 82 and 84 are allowed by the "floating" concept of the valve element relative to the valve stem to be maintained in 360° contact at all times to provide for even loading therebetween. Since the valve element 34 is allowed to shift laterally with respect to the valve stem 40, there will be developed no eccentric loading between the annular shoulders 82 and 84 and the forces developed between the surfaces therefore will be evenly distributed throughout the contacting area.

With reference to FIGURE 4, a modified embodiment of my invention is illustrated which provides universal action between the extension of the valve element and the stem member to prevent the formation of excessive stress loads which might otherwise be developed by minor misalignment of parts in any lateral direction relative to the axis of the stem. As illustrated in FIGURE 4, a modified valve stem 92 is provided with an enlarged head 94 at the lowermost extremity thereof. The enlarged head 94 is provided with an elongated key 95 at the lower extremity thereof which is received within an elongated slot 70 formed in the extension 66 of the valve element 34. It should be noted that the valve element of the modified embodiment of my invention is generally identical with the valve element of the preferred embodiment illustrated in FIGURES 1 through 3. The enlarged head 94 is provided with a generally spherical upper surface defining an annular generally spherical thrust surface 96. A collar member 98 having a stem aperture 100 is disposed about the valve stem 40 and the enlarged head 94 and is threadedly connected to the extension 66 of the valve element 34. The stem aperture 100 is enlarged at 102 to allow for lateral shifting of the collar relative to the enlarged head 94. An internal shoulder 104 is defined within the collar by a generally spherical surface of the same general curvature as the curvature of the surface 96. The spherical surfaces 96 and 104 cooperate to allow axial misalignment of the valve stem 92 and the valve element and at the same time cooperate to maintain even contact between the stem and the collar. This structure effectively provides for even distribution of loads between the stem and collar and ordinarily maintains the stress level of the material from which the parts are composed at a level below that at which stress corrosion is likely to occur. With minor misalignment of the parts of the stem connection, there will be no tendency to cause binding between the thrust surfaces 96 and 104 which could otherwise develop small areas of excessively high material stress. The universal action of the connection structure illustrated in FIGURE 4 virtually eliminates the development of lateral stresses in the connection parts and also provides for low stress and even load distribution in tension.

It will be evident from the foregoing that I have provided a unique connection construction for effective low stress connection between the stem and movable element of a mechanical device. The stem connection structure of my invention effectively achieves maximum strength without requiring any increase in the amount of structural material required for the formation of the connection structure. The novel design of my invention allows lateral shifting of the parts of the connection structure relative to the stem to compensate for minor manufacturing inaccuracies and other causes which could result in the development of material stress of sufficient magnitude to cause stress corrosion. My invention effectively allows lateral shifting of the valve element in a downstream direction by the pressurized fluid controlled by the valve so that proper sealing engagement is established between the valve element and the downstream seat member and yet allows the connection structure between the valve stem and valve element to be relatively free of lateral stresses. My invention effectively promotes long-life of the internal components of valves even when the same are disposed in sour services, such as hydrogen sulfide.

It is seen therefore that this invention is one adapted to obtain all of the objects hereinabove set forth together with other advantages which will become obvious and inherent from the description of the apparatus itself. It will be understood that certain combinations and subcombinations are of utility and may be employed without reference to other features and subcombinations.

This is contemplated by and is within the scope of the claims. As many possible embodiments may be made of this invention without departing from the spirit or scope thereof.

What is claimed is:

1. A gate valve comprising a valve body defining on open ended valve chamber and having inlet and outlet passages in fluid communication with the valve chamber, seat means provided within said valve body, a gate member disposed within said valve chamber and being movable between open and closed positions relative to said seat means to control the flow of fluid through said inlet and outlet passages, said gate member having a threaded stem connection extension thereon, said stem connection extension having a slot formed therein being disposed in substantially parallel relation with the axes of said inlet and outlet passages, bonnet means forming a closure for said valve chamber, a vertically movable valve stem carried by said bonnet and having one end thereof disposed within said valve chamber, said valve stem having an elongated key formed thereon, said key being received by said slot whereby said gate may shift downstream with respect to the axes of said stem without binding either said gate or said stem, an enlarged head formed on said stem, a collar received on said stem and having an annular collar disposed in threaded engagement with said threaded extension of said gate, said collar having a loose fit with said stem whereby said collar may shift downstream with said gate and remain substantially parallel with the axis of said stem without causing binding between said gate and stem.

2. A low stress stem connection structure for controlling reciprocal movement of the gate of a gate valve, said connection structure having an operating stem having an enlarged head at the lower extremity thereof and having an elongated key formed at the lower portion of said head, an extension on said gate having an elongated slot formed therein in substantial alignment with the flow of fluid through the valve, the key of said valve stem and said slot of said extension being in interengagement whereby said gate may move in the direction of flow of fluid through the valve and said valve element is restrained from movement laterally of the direction of fluid flow, a collar member received about said stem and being connected to said gate member to retain said stem and gate in assembly, said collar being substantially larger than the diameter of said stem whereby said gate and said collar may shift downstream relative to said stem without binding either said gate or said stem.

3. A low stress stem connection structure as set forth in claim 2, said collar surrounding said stem and having an annular internal thrust surface engaging said thrust shoulder, said collar being threadedly retained on said extension to maintain said stem key and said extension slot in interengagement.

4. A low stress stem connection structure as set forth in claim 3, said annular thrust shoulder being of generally spherical form, said annular internal thrust surface being generally spherical and fitting with said generally spherical thrust shoulder to form a universal connection therebetween.

5. A valve comprising a valve body defining a valve chamber and having inlet and outlet passages in fluid communication with the valve chamber, a gate member, disposed within the valve chamber and being movable between open and closed positions to control the flow of fluid through said valve, said gate member having an externally threaded extension formed thereon, said extension having an elongated slot formed therein and disposed substantially parallel to said inlet and outlet passages, a valve stem carried by said valve, means for inducing reciprocal movement to said valve stem, said valve stem having an enlarged head at the lower extremity thereof and having an elongated key at the lower portion of said enlarged head, said key being disposed within said elongated slot whereby nonrotatable connection will be established between said stem and said gate and said gate will be allowed to move downstream relative to said stem without binding said gate or stem, a collar surrounding a portion of said stem and surrounding said enlarged head and threadedly receiving said externally threaded extension, said collar being substantially larger than said stem thereby allowing shifting of said collar downstream with said gate whereby neither said gate, said stem, or said collar will be subjected to excessive stresses.

6. A valve as set forth in claim 5, said enlarged head defining an annular thrust shoulder, said thrust shoulder being a partially spherical surface, said thrust surface being a partially spherical surface and being in intimate engagement with said thrust shoulder, said spherical surfaces cooperating to allow angular misalignment of said valve element relative to said stem without involving the development of excessive lateral stresses and maintaining maximum contacting area between said thrust shoulder and said thrust surface.

References Cited
UNITED STATES PATENTS

| | | | |
|---|---|---|---|
| 1,991,621 | 2/1935 | Noll | 251—84 X |
| 2,950,897 | 8/1960 | Bryant | 251—172 |
| 3,071,343 | 1/1963 | Milleville | 251—175 |
| 3,301,523 | 1/1967 | Lowrey | 251—332 X |

WILLIAM F. O'DEA, Primary Examiner

D. R. MATTHEWS, Assistant Examiner

U.S. Cl. X.R.

251—175, 193, 266, 327